March 7, 1961 — A. J. BENNETT ET AL — 2,974,314

ELECTRICAL CIRCUITS FOR USE WITH TEMPERATURE RESPONSIVE DEVICES

Filed Aug. 26, 1959 — 2 Sheets-Sheet 1

INVENTOR

Arthur John Bennett & Leslie Thorpe Thorlby

BY

Mason, Mason & Albright

ATTORNEY

March 7, 1961 | A. J. BENNETT ET AL | 2,974,314
ELECTRICAL CIRCUITS FOR USE WITH
TEMPERATURE RESPONSIVE DEVICES
Filed Aug. 26, 1959 | 2 Sheets-Sheet 2

INVENTOR
Arthur John Bennett & Leslie Thorpe Thorlby
BY
Mason, Mason & Albright
ATTORNEY United States Patent Office 2,974,314

Patented Mar. 7, 1961

2,974,314

ELECTRICAL CIRCUITS FOR USE WITH TEMPERATURE RESPONSIVE DEVICES

Arthur John Bennett, Brentford, and Leslie Thorpe Thurlby, Amersham, England, assignors of one-half to Graviner Manufacturing Company Limited, a British company, and one-half to Wilkinson Sword Limited, a British company, both of London, England

Filed Aug. 26, 1959, Ser. No. 836,106

Claims priority, application Great Britain Aug. 29, 1958

7 Claims. (Cl. 340—227)

This invention relates to electrical circuits, and is particularly concerned with electrical circuits adapted for use with temperature responsive devices of the kind which have an electrical resistance which varies in accordance with variations in the temperature to which the device is exposed.

According to the present invention there is provided an electrical circuit comprising a temperature responsive device whose electrical resistance varies with temperature, indicating, warning or control means, and a transistor switching circuit coupled to said resistance element and switched from one state to another when said resistance element reaches a predetermined temperature, switching from the one state to the other effecting operation of said indicating, warning or control means.

The invention also provides an electrical circuit comprising a transistor oscillator, means for feeding an oscillatory output from said oscillator via a temperature responsive device to a transistor switching circuit, said switching circuit only being switched to a predetermined switching condition when the temperature responsive device reaches a predetermined temperature, and indicating, warning or control means which is operated by switching of said switching circuit to said predetermined switching condition.

The invention further provides an electrical circuit comprising a monostable transistor switching circuit adapted to provide a pulsed output when energised by the oscillatory output from a temperature responsive device exposed to a predetermined temperature, and a further transistor controlling the operation of indicating, warning or control means and from the output of said switching circuit whereby the indicating, warning or control means is operated when a pulsed output from the switching circuit is fed to said further transistor.

One circuit in accordance with the present invention will now be described, by way of example only, reference being made to the accompanying drawings in which.

Figure 1:
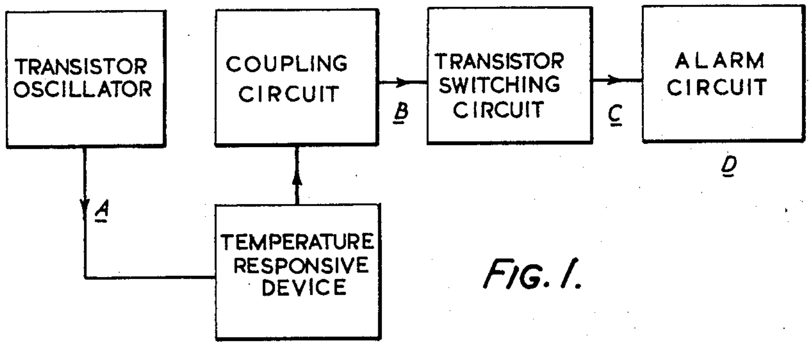
Figure 1 is a block diagram of the circuit.

Basically, as shown in the block diagram of Figure 1, the circuit comprises, first, a transistor oscillator powered from a direct current source and generating alternating current for supply to the temperature responsive device, or other utilisation means with which the circuit is to be used. The other main elements of the circuit are a coupling circuit for feeding any alternating current output from the utilisation means to a transistor switching circuit which in turn controls an alarm circuit.

Figure 3:
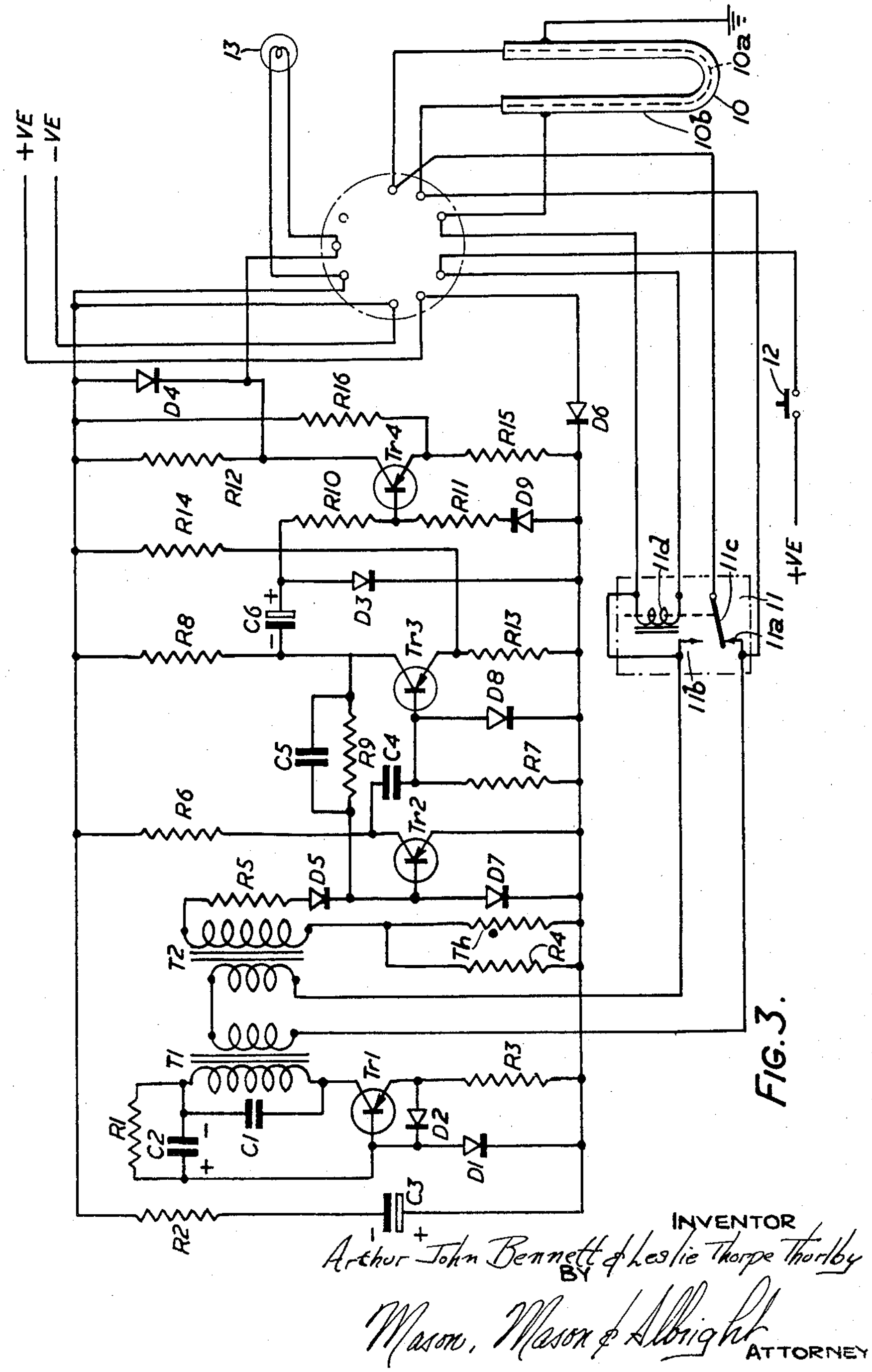
Figure 3 is a full diagram of the circuit.

Referring now to the details of these main elements, as shown in the circuit diagram of Figure 3, it will be seen that the oscillator is of the Hartley type using a transistor $Tr_1$, the oscillator inductance being the primary winding of a transformer $T_1$ which in parallel with capacitor $C_1$ primarily determines the frequency of oscillation.

Capacitor $C_2$ provides a feed-back path and resistors $R_1$ and $R_3$ provide the required bias, the latter resistor also providing a measure of negative feed-back to improve waveform and stability. Resistor $R_2$ serves to maintain the voltage applied to transistor $Tr_1$, from the negative terminal of a 24 volt direct current supply, within its specified upper limit, decoupling being provided by capacitor $C_3$. Germanium diodes $D_1$ and $D_2$ are used to stabilise the circuit against ambient temperature variations by virtue of their resistance/temperature characteristics. The transistor $Tr_1$ and diodes $D_1$ and $D_2$ may be mounted in holes in a metal block designed to constitute a heat sink so that all three elements are as nearly as possible at the same temperature; the block also allows greater power dissipation from the transistor $Tr_1$. The alternating current output from the oscillator, which may for example be of the order of 400 cycles per second, is taken from the secondary winding of transformer $T_1$ via the temperature responsive device 10 and thence through the primary winding of transformer $T_2$. As illustrated in the drawing the temperature responsive device 10 may be of the coaxial cable variety in which the spacing material between the inner conductor 10*a* and outer sheath 10*b* has a resistance which varies with temperature. One end of the inner conductor 10*a* is connected to the lower contact 11*a* of an electromagnetic relay 11 and the other end of the inner conductor 10*a* is connected to a moving contact 11*c*. The outer sheath 10*b* is earthed and is connected to the upper contact 11*b* and to one end of the energising coil 11*d*, the other end of the coil 11*d* being connected via a test switch 12 to the positive terminal of a direct current supply whose negtaive terminal is earthed, closure of the test switch 12 moving the moving contact 11*c* from the lower contact 11*a* to the upper contact 11*b*.

The coupling circuit constituted by the secondary winding of transformer $T_1$ and the primary winding of transformer $T_2$ is connected in series between the lower contact 11*a* and the upper contact 11*b* and thus the transfer of alternating current from the oscillator through the coupling circuit is determined by the resistance of the spacing material of the temperature responsive device 10. Decrease in the resistance of the spacing material due to increased temperature will result in an increase in the voltage applied to the primary of transformer $T_2$ and the subsequent switching circuit is arranged to trigger the alarm at a predetermined value of resistance of the spacing material, which corresponds to a predetermined temperature. The device 10 is fed from both ends of the inner conductor in order that a single break along the length of the device will not prevent operation. However, testing by closure of switch 12 connects the inner conductor 10*a* across the coupling circuit and thus an accidental breakage in the device or elsewhere in the circuit will be indicated by failure of the alarm to respond when the test switch is operated or failure to respond will indicate a fault elsewhere in the circuit.

The switching circuit is essentially a monostable multivibrator the circuit elements of which are transistors $Tr_2$, $Tr_3$ resistors $R_5$, $R_6$, $R_7$, $R_8$, $R_9$, $R_{13}$ and capacitors $C_4$, $C_5$. With little signal coming via transformer $T_2$, transistor $Tr_2$ is conducting and transistor $Tr_3$ is cut off. When the resistance of the device 10 falls, the coupling circuit will increase the voltage from the secondary of transformer $T_2$ impressed on the resistor $R_5$ and the base of transistor $Tr_2$. During the half cycle when the transformer $T_2$ is applying a negative voltage to $R_5$, the tendency should be for transistor $Tr_2$ to conduct more current, but this is impossible since resistor $R_6$ is entirely limiting the current since the transistor is "bottomed," i.e. it is effectually a short circuit in comparison with $R_6$. The result of this half cycle of voltage is therefore to produce no effect. However, during the half cycle when the transformer $T_2$ is applying a positive voltage to $R_5$, changes in current flow in the two transistors $Tr_2$, $Tr_3$ will ensue. The first effect is to reduce the collector current of $Tr_2$ and thereby increase the collector voltage negatively. This change of voltage is impressed via capacitor $C_4$ to the base of transistor $Tr_3$ and is in such a sense as to make its collector current increase. This increase in collector current will cause the collector potential to become more positive and this change is fed back via resistor $R_9$ and capacitor $C_5$ to the base of $Tr_3$, thus aiding initial action. This chain of events can therefore be cumulative in effect if the incoming signal and the gain around the feed-back loop are of sufficient magnitude, and the circuit can rapidly be driven to the state when $Tr_2$ is cut off and $Tr_3$ is conducting.

This state is, however, unstable, and charging of the capacitor $C_4$ via resistor $R_6$ will bring about conditions which will force the circuit to revert rapidly to the original stable state. The repetition frequency of the switching current can be, and generally will be, less than the oscillator frequency. The pulse duration can be arranged to be approximately 10% of the period between pulses. Thus, when the temperature of the device 10 is sufficiently high, the output from the collector of $Tr_3$ is a series of positive-going pulses with a mark to space ratio of about 1:10. Diodes $D_7$ and $D_8$ prevent the respective bases of transistors $Tr_2$ and $Tr_3$ from being driven positive with respect to the positive supply line as a result of line voltage surges.

Final fashioning of the input signal from the switching circuit into the alarm circuit is effected by means of the "diode clamp" or "D.C. restoration" circuit, comprising diode $D_3$, capacitor $C_6$ in conjunction with resistors $R_8$, $R_{10}$, $R_{11}$. When the junction point of $C_6$, $R_{10}$ and $D_3$ tends to go positive with respect to the positive supply line the diode $D_3$ conducts and the potential of the junction point is virtually that of the positive supply line. When $Tr_3$ is cut-off the negative going pulse from its collector is transmitted via $C_6$ to the junction point which can now go negative with respect to its former potential (since the back resistance of diode $D_3$ is large compared with its forward value). Almost the whole of the pulse amplitude is thus applied to the junction since the change in charge on capacitor $C_6$ in this time is negligible and is made up in the next positive pulse. The series of negative pulses, applied to the base of power transistor $Tr_4$, will of course have a mark to space ratio of about 10:1 and hence a fall in the value of the resistance of the spacing material of device 10 to the predetermined level will result in the base of the power transistor $Tr_4$ receiving a negative signal for approximately 90% of the total time.

Figure 2:
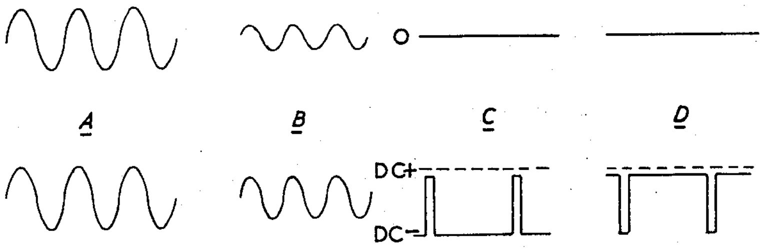
Figure 2 shows typical waveforms at different parts of the circuit in different conditions of operation, whilst

Figure 2 shows in the upper set of waveforms how with the device 10 at low temperature the oscillations applied to the switching circuit are insufficient to produce switching and therefore there is no signal at points C and D. On the other hand with the device 10 at elevated temperature the greater output from the coupling circuit causes operation of the switching circuit to give the pulse waveforms indicated at points C and D.

The alarm circuit consists of power transistor $Tr_4$, resistor $R_{12}$ and an alarm device 13 which is connected across resistor $R_{12}$. The presence of a germanium diode $D_4$ across resistor $R_{12}$ is desirable if the alarm device 13 is an inductive circuit, e.g. a relay. This diode may, however, be omitted if the alarm device 13 is a warning lamp. It will be understood that instead of an alarm device other indicating, warning or control means may be operated, as desired.

In the absence of any signal on its base, transistor $Tr_4$ will be in the cut-off state, but if the train of negative pulses arrives it will be switched on for the duration of each pulse and hence the alarm device will be energised for 90% of the total time, which is adequate to give steady illumination of a lamp or to maintain a relay in the operated condition.

The collector current of transistor $Tr_2$ is stabilised against temperature changes by junction diode $D_5$ and thermistor $Th$ in parallel with resistor $R_4$, the trigger sensitivity depending mainly upon this transistor and its associated circuit. Resistors $R_{13}$, $R_{14}$, $R_{15}$ and $R_{16}$ are provided to ensure greater stability at elevated temperatures, and diode $D_9$ provides temperature compensation for transistor $Tr_4$.

The method of switching the load, using pulses of 90% total time duration derived from the pulse output of the switching circuit, enables resistor/capacitor coupling to be used throughout, thereby ensuring greater stability and freedom from drift, which might be encountered in a system where a D.C. level is derived from an A.C. input to trigger a circuit of the Eccles-Jordan type giving a D.C. output to the load. It is thus possible to obtain D.C. switching in effect without the problems normally associated with such a method.

The circuit avoids the use of moving parts except in the test circuit, failure of which would be relatively unimportant. Problems resulting from the temperature limitations of transistors are reduced because the final transistor operating the indicating, warning or control means is switched off until the temperature sensitive device reaches the predetermined temperature, the switching circuit providing definite On/Off operation.

The system is relatively independent of supply voltage since the A.C. input to the trigger circuit is proportional to the D.C. supply voltage while the trigger sensitivity is approximately inversely proportional to the D.C. supply voltage.

Transistors $Tr_3$ and $Tr_4$ which are normally cut-off in the non-operative condition of the temperature-responsive device 10 are biased beyond cut-off, and thereby the possibility of a false warning being given at elevated temperatures is avoided.

It will be appreciated that the temperature at which an indication is given may be controlled by varying the value of resistor $R_5$. If this value is increased the current fed to the base of transistor $Tr_2$ will be decreased and the temperature at which an indication is given will be raised. At the same time increasing the value of resistor $R_5$ increases the stability of the stable state of the multivibrator and a larger input will be required to trigger it so that in fact the warning temperature is raised even further in proportion to the increase in the value of the resistor. Furthermore, with practical circuits it has been found that loading of the multivibrator can result in a differential between the temperature of device 10 at which the alarm is operated and the temperature at which the alarm ceases to operate. This effect can be used to control to an extent the temperature of the device 10 corresponding to the cessation of alarm. It is also possible to use thermistors for compensating against fall in sensitivity with rising temperature.

We claim:

1. An electrical circuit comprising a temperature responsive device whose electrical resistance falls with rising temperature, a source of oscillatory voltage, a monostable transistor switching circuit having an input transistor stage and an output transistor stage, said input transistor stage being normally conductive and said output transistor stage being normally non-conductive, circuit connections coupling said oscillatory voltage source via said temperature responsive device to the input stage of said transistor switching circuit whereby when said temperature responsive device attains a predetermined temperature said switching circuit is switched to render said output stage conductive, a further transistor, a capacitor having two electrodes and coupling said output stage to the input of said further transistor, rectifying means, an electrically energised warning device, said warning device being electrically connected to said further transistor and being electrically energised by conduction of said further transistor, and a transistor supply source, said rectifying means coupling one electrode of said capacitor to said supply source, said rectifying means conducting only when said output stage is conductive and thereby connecting said one electrode of said capacitor to said supply source, the negative going pulses which occur when said output stage ceases to conduct being transmitted through said capacitor to said further transistor to render said further transistor conductive and thereby energise said warning device.

2. An electrical circuit comprising a temperature responsive device whose electrical resistance falls with rising temperature, a source of oscillatory voltage, a monostable transistor switching circuit having an input transistor stage and an output transistor stage, said input transistor stage being normally conductive and said output transistor stage being normally non-conductive, circuit connections coupling said oscillatory voltage source via said temperature responsive device to the input stage of said transistor switching circuit whereby when said temperature responsive device attains a predetermined temperature said switching circuit is switched to render said output stage conductive, a capacitor having two electrodes, a first resistor, a diode rectifier, a further transistor, a warning lamp, and a transistor supply source having a collector voltage line and an emitter voltage line, one electrode of said capacitor being connected to the collector of said output transistor and the other electrode of said capacitor being connected through said resistor to the base of said further transistor, the junction point of said resistor and capacitor being connected through said diode rectifier to the emitter voltage line, said diode rectifier conducting only when said output stage is conductive so that during such periods the potential of said junction point approximates to the potential of said emitter voltage line, the negative going pulse which occurs when said output stage ceases to conduct being transmitted through said capacitor to said further transistor to render said further transistor conductive and thereby illuminate said warning lamp.

3. A circuit according to claim 2, further comprising a first transformer having input and output windings and a second transformer having input and output windings, the input winding of said first transformer being coupled to said transistor oscillator, the output winding of said first transformer being connected in series electrical circuit with the input winding of said second transformer and with said temperature responsive device, and the output winding of said second transformer being electrically connected to the input stage of said transistor switching circuit.

4. A circuit according to claim 2, wherein the output transistor stage is only conductive for a fraction of the period of a switching cycle.

5. An electrical circuit according to claim 2, wherein said temperature responsive device comprises two elongated conductors separated by a material whose resistance decreases with increasing temperature.

6. An electrical circuit according to claim 5 comprising means for selectively connecting one of said conductors in parallel circuit with said temperature responsive device for testing both the continuity of the conductor and the correct operation of the circuit.

7. An electrical circuit comprising a temperature responsive device whose electrical resistance falls with rising temperature, a source of oscillatory voltage, a monostable transistor switching circuit having an input transistor stage and an output transistor stage, said input transistor stage being normally conductive and said output transistor stage being normally non-conductive, circuit connections coupling said oscillatory voltage source via said temperature responsive device to the input stage of said transistor switching circuit whereby when said temperature responsive device attains a predetermined temperature said switching circuit is switched to render said output stage conductive, a further transistor, capacitive coupling means coupling said output transistor stage to the input of said further transistor, said capacitive coupling means transmitting to the input of said further transistor substantially the total pulse amplitude of the negative going pulse developed at the output transistor stage when said output transistor stage ceases to conduct whereby said further transistor is rendered conductive, and an electrically energised warning device electrically connected to said further transistor and electrically energised by conduction of said further transistor.

References Cited in the file of this patent

UNITED STATES PATENTS

| | | |
|---|---|---|
| 2,825,012 | Consoliver et al. | Feb. 25, 1958 |
| 2,852,702 | Pinckaers | Sept. 16, 1958 |
| 2,901,740 | Cutsogeorge | Aug. 25, 1959 |